United States Patent
Robinson et al.

(10) Patent No.: US 10,208,863 B2
(45) Date of Patent: Feb. 19, 2019

(54) PRESSURE ASSISTED CONNECTION FOR A VALVE SHAFT

(71) Applicant: Dyna-Flo Control Valve Services Ltd., Edmonton (CA)

(72) Inventors: Cam B. Robinson, Sherwood Park (CA); Curtis Dale, Beaumont (CA)

(73) Assignee: Dyna-Flo Control Valve Services Ltd., Edmonton (CA)

( * ) Notice: Subject to any disclaimer, the term of this patent is extended or adjusted under 35 U.S.C. 154(b) by 0 days.

(21) Appl. No.: 15/494,149

(22) Filed: Apr. 21, 2017

(65) Prior Publication Data

US 2018/0306333 A1    Oct. 25, 2018

(51) Int. Cl.
F16K 5/06    (2006.01)

(52) U.S. Cl.
CPC ................. *F16K 5/0626* (2013.01)

(58) Field of Classification Search
CPC .... F16K 5/0631; F16K 5/0642; F16K 5/0647; F16K 5/0626; Y10T 137/0508; Y10T 137/6031; Y10T 137/6035; Y10T 137/6055
USPC ............ 251/315.16, 315.14, 315.13, 315.09, 251/315.08, 315.01, 308; 137/15.22, 137/315.17, 315.18, 315.24; 403/356
See application file for complete search history.

(56) References Cited

U.S. PATENT DOCUMENTS

| | | | |
|---|---|---|---|
| 349,005 A * | 9/1886 | Sargent | F16D 1/0847 403/362 |
| 1,008,398 A | 11/1911 | Willcox | |
| 2,207,400 A | 7/1940 | Gass | |
| 3,528,448 A * | 9/1970 | Urban | F16K 5/0642 137/242 |
| 4,057,217 A | 11/1977 | MacDonald | |
| 4,113,229 A | 9/1978 | Fujiwara | |
| 4,225,114 A | 9/1980 | Barthelemy et al. | |
| 4,231,545 A | 11/1980 | Nelimarkka | |
| 4,336,919 A | 6/1982 | Hall | |
| 4,483,513 A * | 11/1984 | Summers | F16K 1/22 251/308 |

(Continued)

OTHER PUBLICATIONS

"Model 570, 571, 573 Control Valve—Operation, Parts, and Instruction Manual," Dyna-Flo Control Valve Services Ltd., <www.dynaflo.com> [retrieved Aug. 11, 2017], available at least as early as Dec. 15, 2016, 36 pages.

*Primary Examiner* — Michael R Reid
(74) *Attorney, Agent, or Firm* — Christensen O'Connor Johnson Kindness, PLLC

(57) ABSTRACT

A valve having a valve closure member in a valve housing is provided. The valve closure member has a shaft received within an aperture of the closure member and extending out of the housing. One or more locking apertures are formed between an inner surface of the aperture of the valve closure member and an outer surface of the shaft, the locking apertures being angled outward from an axis of the shaft and toward the interior end of the shaft. One or more locking members are inserted into and engage each of the locking apertures, the locking members securing the position of the shaft relative to the valve closure member such that rotation of the shaft rotates the valve closure member between an open position and a closed position and such that internal pressure from within the valve housing increases the engagement between the locking members and the locking apertures.

14 Claims, 6 Drawing Sheets

(56) References Cited

U.S. PATENT DOCUMENTS

| | | |
|---|---|---|
| 4,519,412 A | 5/1985 | Grazioli |
| 4,579,477 A | 4/1986 | Hartman |
| 4,615,532 A * | 10/1986 | Biller .................. F16G 11/048 24/115 M |
| 4,768,750 A | 9/1988 | Wilson |
| 5,356,116 A | 10/1994 | Morgan et al. |
| 5,386,967 A * | 2/1995 | Enniss .................. F16K 5/0647 251/315.04 |
| 5,743,512 A | 4/1998 | Greenberg |
| 6,129,336 A | 10/2000 | Sandling et al. |
| 7,306,010 B2 | 12/2007 | Gruener, Sr. |
| 8,210,499 B2 | 7/2012 | Madden et al. |
| 8,308,131 B2 | 11/2012 | Gutmann et al. |
| 8,752,809 B2 | 6/2014 | Dalluge et al. |
| 2006/0153945 A1 | 7/2006 | Blais et al. |
| 2015/0090916 A1 | 4/2015 | Zollinger |
| 2015/0276078 A1 | 10/2015 | Xiao et al. |

\* cited by examiner

PRESSURE ASSISTED CONNECTION FOR A VALVE SHAFT

TECHNICAL FIELD

This relates generally to control mechanisms for valves, and in particular, to valve shaft connections.

BACKGROUND

Rotary Control Valves are used extensively in various process control applications. A shaft is typically fixed to a controlling member using a tapered pin or key inserted perpendicular to the centerline of the shaft. It is desirable in control valve applications to have a shaft connection that does not allow any hysteresis. For tapered pin type connections, the shaft and controlling member must be assembled as a matched set. A tapered reamer is used to machine the correct size of taper to match the taper pin. During assembly, the tapered pin is forcibly inserted into the tapered hole and effectively wedged in place. A tapered key uses a tapered flat surface machined longitudinally onto a round bar creating a half round tapered pin. Assembly of the shaft to the controlling member requires the key to be forcibly inserted and effectively wedged in place. Both designs rely on the wedging effect of the key or pin to stay in place. U.S. Pat. No. 4,768,750 (Wilson) entitled "Valve joint connection" is an example of a ball valve that uses a tapered wedge to lock the shaft to the valve member. It is not uncommon for these types of wedged pins to come loose when subjected to repeated cycles especially when torques are higher

SUMMARY

According to an aspect, there is provided a valve, comprising a valve closure member in a valve housing, a shaft having a first end and a second end, the first end being received within a shaft-receiving aperture of the valve closure member, and the second end extending out of the valve housing, one or more locking apertures defined by a first portion formed in an inner surface of the shaft-receiving aperture of the valve closure member and a second portion formed in an outer surface of the shaft, the locking apertures being angled outward from an axis of the shaft and toward the first end of the shaft, and one or more locking members, each locking member being inserted into one of the locking apertures and engaging the first portion and the second portion of the respective locking aperture, the locking member securing the position of the shaft relative to the valve closure member such that rotation of the shaft rotates the valve closure member between an open position and a closed position and such that internal pressure from within the valve housing increases the engagement between the locking members and the locking apertures.

According to another aspect, the valve may comprise two or more locking apertures and two or more locking members.

According to another aspect, the two or more locking apertures may be spaced evenly about a circumference of the shaft.

According to another aspect, the valve may further comprise a retainer that threadably engages the shaft-receiving aperture and retains the first end of the shaft.

According to another aspect, the first end of the shaft may have an outer diameter that is less than an inner diameter of the shaft-receiving apertures such that the first end of the shaft is insertable through the shaft-receiving apertures prior to the locking members being inserted into the locking apertures.

According to another aspect, the one or more locking apertures may be exclusively accessible via an inner cavity of the valve housing when the shaft is received within the shaft receiving aperture.

According to another aspect, the valve closure member may be a ball valve.

According to an aspect, there is provided a method of assembling a valve comprising inserting a valve closure member into a valve housing, inserting a first end of a shaft through the valve housing and the valve closure member such that the first end is received within a shaft-receiving aperture of the valve closure member and such that a second end of the shaft extends out of the valve housing, and installing one or more locking members in one or more locking apertures, each locking aperture being defined by a first portion formed in an inner surface of the shaft-receiving aperture of the valve closure member and a second portion formed in an outer surface of the shaft, each locking aperture being angled outward from an axis of the shaft and toward the first end of the shaft, wherein each locking member engages the first portion and the second portion of the respective locking aperture to secure the position of the shaft relative to the valve closure member such that rotation of the shaft rotates the valve closure member between an open position and a closed position and such that internal pressure from within the valve housing increases the engagement between the one or more locking members and the one or more locking apertures.

According to another aspect, the one or more locking apertures may comprise two or more locking apertures and the one or more locking members may comprise two or more locking members.

According to another aspect, the two or more locking apertures are spaced evenly about a circumference of the shaft.

According to another aspect, installing locking members may further comprise the step of installing a retainer, the retainer threadably engaging the shaft-receiving aperture and retaining the first end of the shaft.

According to another aspect, the first end of the shaft may have an outer diameter that is less than an inner diameter of the shaft-receiving apertures.

According to another aspect, the one or more locking apertures may be exclusively accessible via an inner cavity of the valve housing when the shaft is received within the shaft receiving aperture.

According to another aspect, the valve closure member may be a ball valve.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
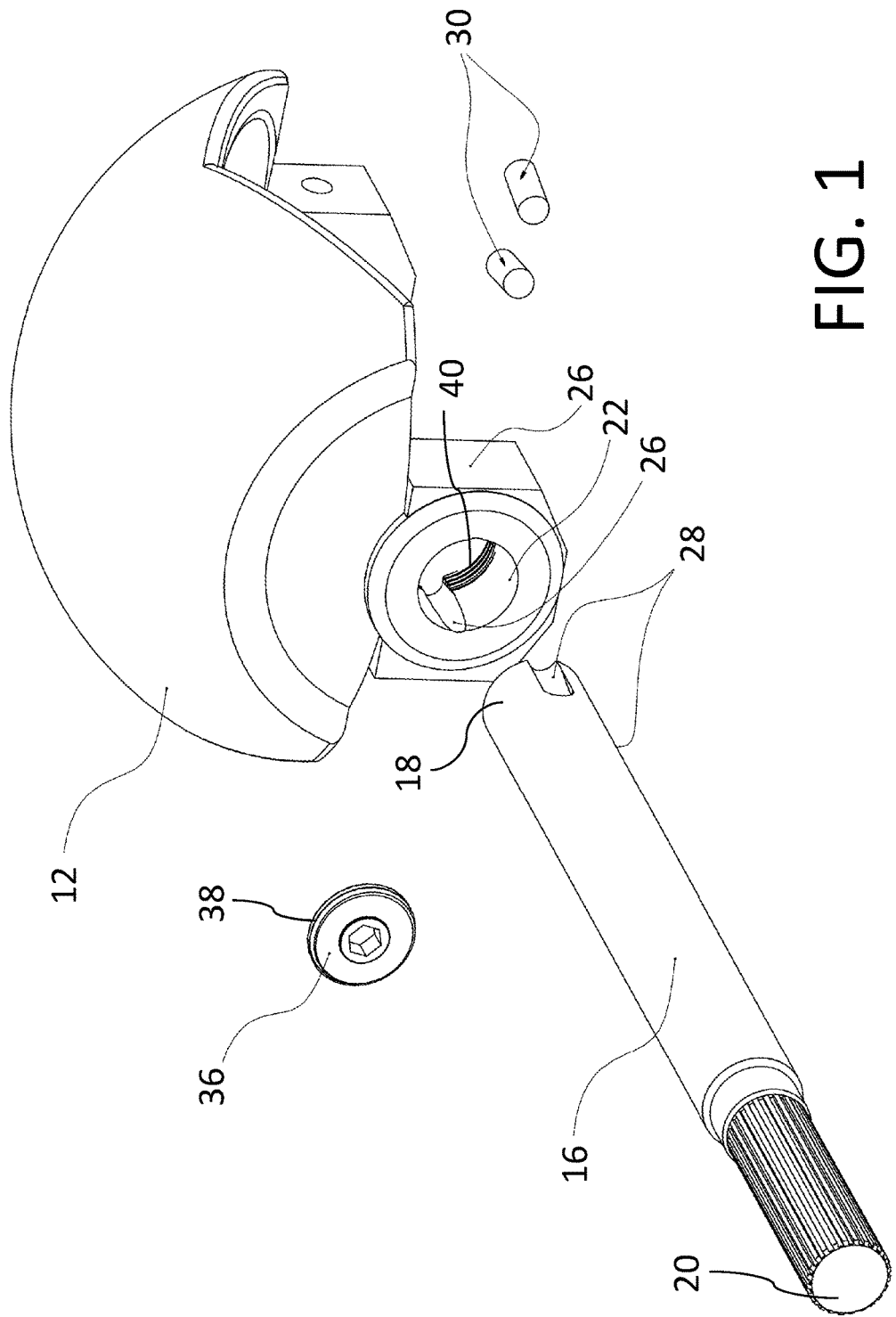
FIG. 1 is a perspective view of an unassembled valve closure member in accordance with the present invention.
Figure 2:
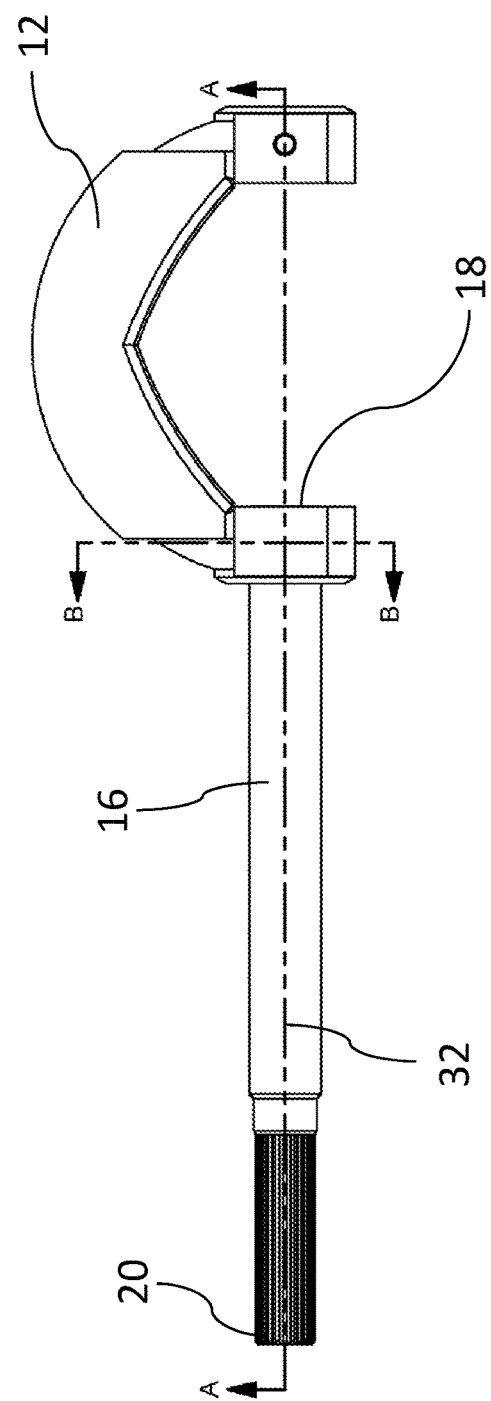
FIG. 2 is a side elevation view of the valve closure member of FIG. 1.

A valve generally identified by reference numeral 10, will now be described with reference to FIGS. 1 through FIG. 6.

Figure 5:
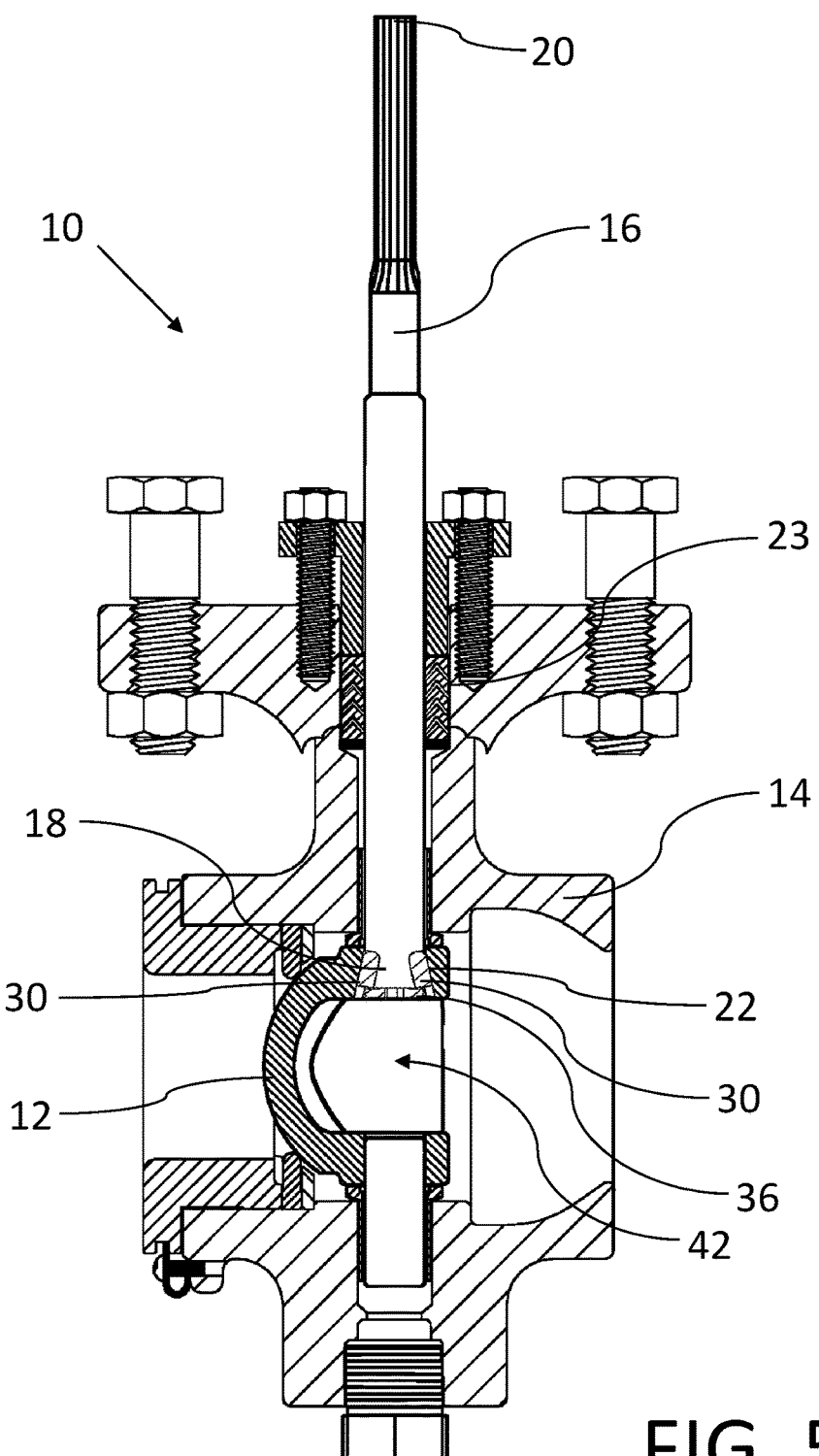
FIG. 5 is a partial side sectional view of a valve closure member in a closed position within a valve housing.

Referring to FIG. 5, valve 10 is made up of valve closure member 12, valve housing 14, and shaft 16. Shaft 16 has a first end 18 and a second end 20, where first end 18 is received within shaft-receiving aperture 22 of valve closure member 12 and second end 20 extends out of valve housing 14. Valve 10 also preferably has packing 23 or other elements to prevent leaks, as is known in the art. The design as shown and discussed below was developed for use in a ball valve. However, it will be understood that the design may be adapted to be used with other types of valves that open and close by rotating a closure member using a shaft.

Figure 4:
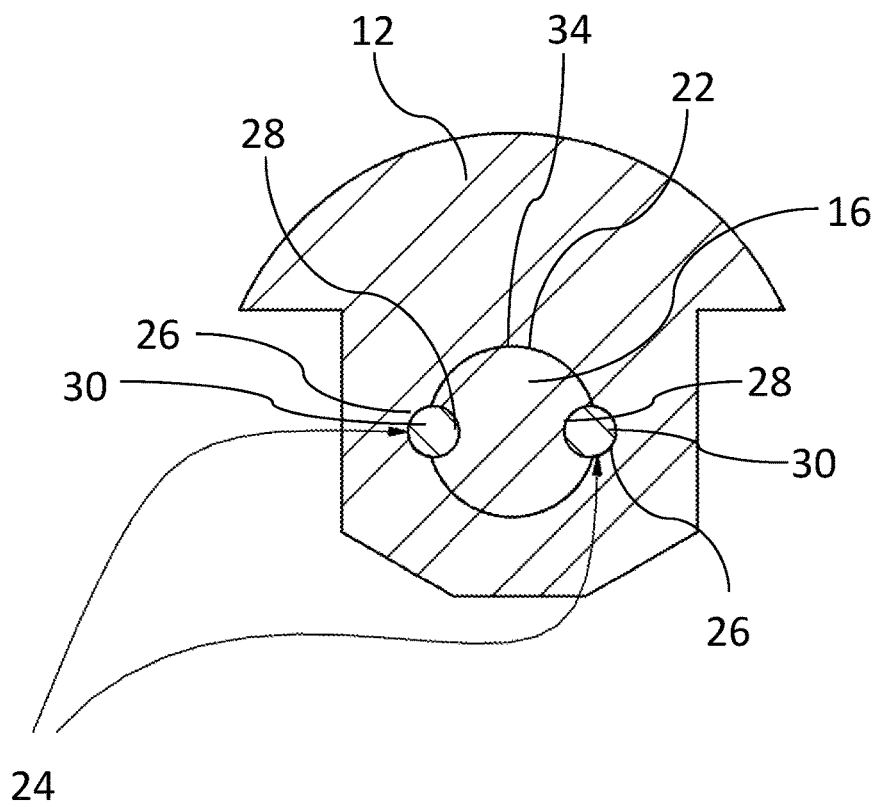
FIG. 4 is a front sectional view of the valve closure member of FIG. 1, taken through line B-B of FIG. 2.

Referring to FIG. 4, locking apertures 24 are provided, defined by first portion 26 formed in an inner surface of shaft-receiving aperture 22 and second portion 28 formed in an outer surface of shaft 16. The number of locking apertures 24 provided will depending on the preferences of the user and the requirements of the application. There may be a single locking aperture 24, however, as shown in FIG. 4, two locking apertures 24 that are spaced evenly about a circumference 34 of shaft 16 are preferred. While this design has many advantages, there may be more than two apertures 24, and apertures 24 need not be evenly spaced. Locking apertures 24 receive locking members 30 such that locking members 30 engage both first and second portions 26 and 28. It has been found that a design with two apertures 24 is convenient as it balances the design, while minimizing the number of required parts and manufacturing requirements.

Figure 3:
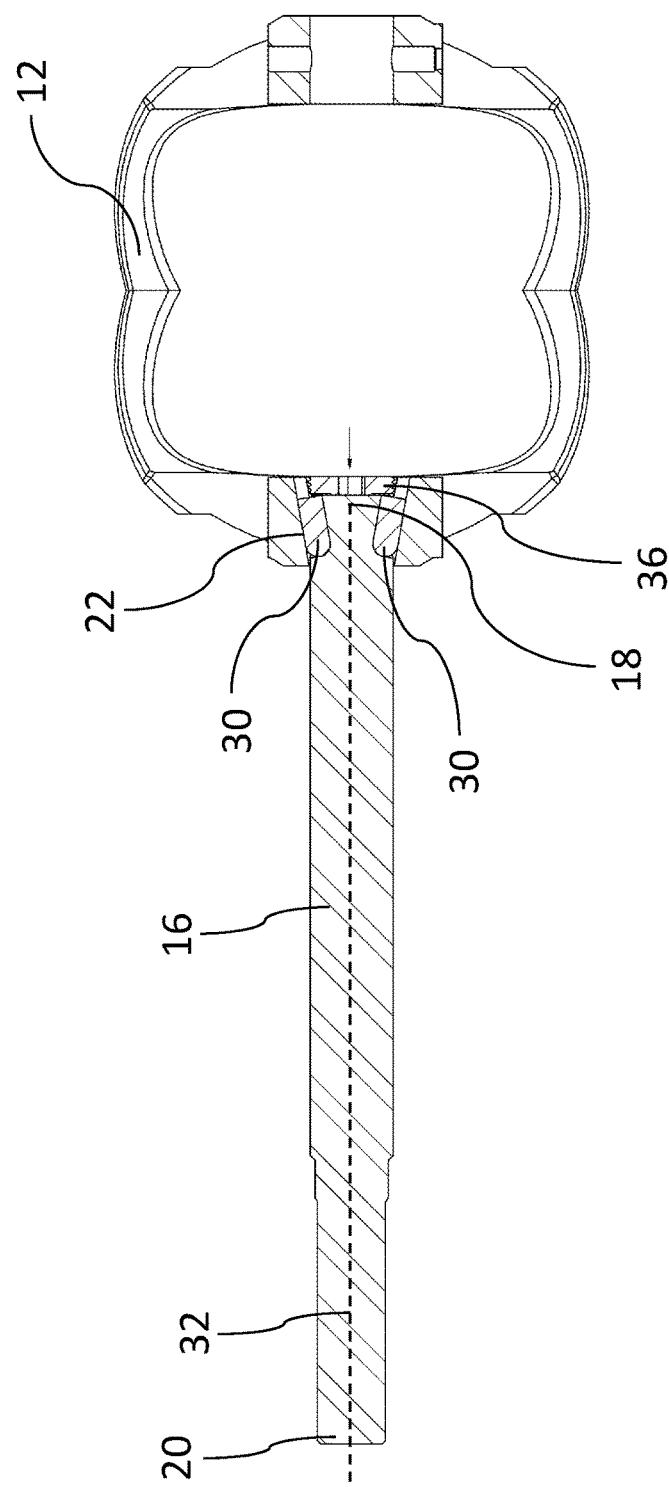
FIG. 3 is a top sectional view of the valve closure member of FIG. 1, taken through the line A-A of FIG. 2.
Figure 6:
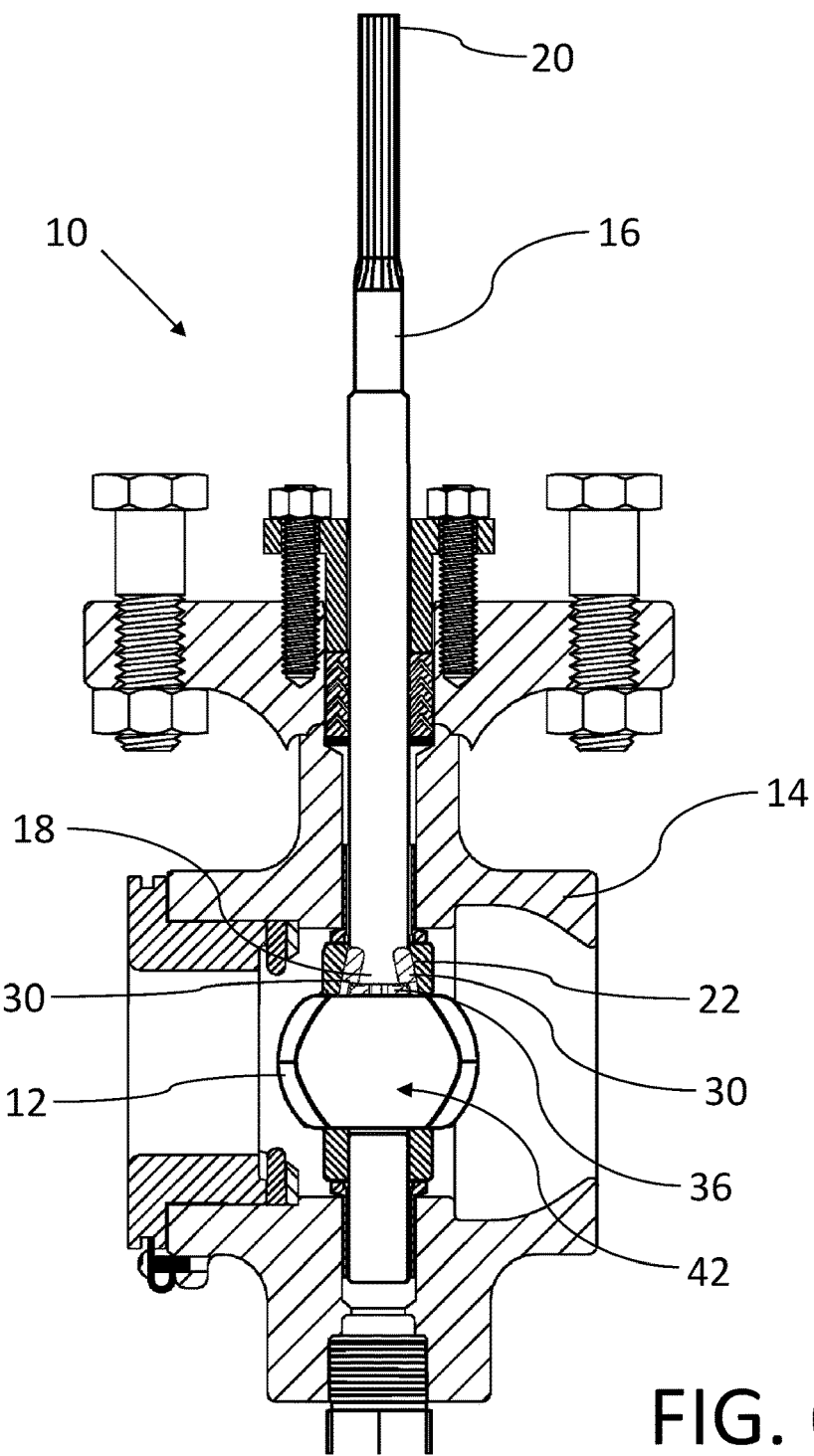
FIG. 6 is a partial side sectional view of a valve closure member in a closed position within a valve housing.

Referring to FIG. 3, locking apertures 24 are angled outward from an axis 32 of shaft 16 toward first end 18 of shaft 16. Each locking aperture 24 receives a locking member 30 that is inserted such that it engages first and second portions 26 and of the respective locking aperture 24. Locking members 30 secure the position of shaft 16 relative to valve closure member 12, allowing valve closure member 12 to be rotate between an open position, as shown in FIG. 6 and a closed position as shown in FIG. 5 by rotating shaft 16, which extends out of valve housing 14. To maximize the engagement between apertures 24 and locking members 30, first and second portions 26 and 28 are preferably of equal size, such that locking member 30 is equally engaged by both. This may change, depending on the preferences of the user and design requirements, so long as the engagement is sufficiently strong to support the engagement between shaft 16 and valve closure member 12.

Referring to FIG. 3, the internal pressure, represented by an arrow, is applied from within valve housing 14 against first end 18 of shaft 16, which, due to the angle of locking apertures 24 and locking members 30, increases the engagement between locking members 30 and locking apertures 24. In order to ensure that locking members 30 and shaft 12 do not move into valve closure member 12 during shipping or assembly, or when internal pressure is not being applied, valve 10 may also have a retainer 36 that engages shaft receiving aperture 22 and retains first end 18 of shaft 16. As shown in FIG. 1, retainer 36 may have threads 38 that engage threads 40 on shaft receiving aperture 22 to install retainer 36. It will be understood that retainer 36 may be omitted, or replaced with another design.

While the angle of locking apertures 24 and locking members 30 act to lock shaft 16 relative to valve closure member 12, shaft 16 is designed such that first end 18 may be installed from the outside of valve housing 14 with valve closure member 16 positioned within valve housing 14. In particular, first end 18 of shaft 16 is sized such that the outer diameter is less than the inner diameter of shaft receiving aperture 22. This allows first end 18 of shaft 16 to be inserted through shaft-receiving aperture 22 prior to locking members 30 being inserted into locking apertures 24. Locking apertures 24 are accessible, and preferably exclusively accessible, via inner cavity 42 of the valve housing 14 when first end 18 of shaft 16 is received within shaft receiving aperture 22. In this way, shaft 16 may be inserted into valve closure member 12 from the outside, and then secured in place by installing locking members 30, which are angled to reduce the likelihood of a loose connection. Placing locking apertures 24 and locking members 30 in this manner may allow for locking members 30 to be secured such that they cannot fall out of place while shaft 16 is in place. This placement of locking members 30 relative to shaft 16 may also prevent shaft 16 from being able to be forced out of shaft-receiving aperture 22 when pressure is applied within valve housing 14. This may further serve to prevent shaft 16 from being launched out of valve housing 14 when high pressures are involved.

A method of assembling valve 10 will now be described. Valve closure member 12 is inserted into valve housing 14, and first end 18 of shaft 16 is inserted through valve housing 14 and valve closure member 12 such that first end 18 of shaft 16 is received within shaft-receiving aperture 22 of valve closure member 12, and such that second end 20 of shaft 16 extends out of valve housing 14. Locking members 30 are installed in the one or more locking apertures 24. Referring to FIG. 5, it can be seen that the size and shape of locking apertures 24 may be such that locking members 30 may only be inserted from inner cavity 42 of valve housing 14. Once inserted, locking members 30 engage first portion 26and second portion 28 of respective locking apertures 24 to secure the position of shaft 16 relative to valve closure member 12 such that rotation of shaft 16 rotates valve closure member 12 between an open position, as shown in FIG. 6, and a closed position, as shown in FIG. 5, and such that internal pressure from within valve housing 14 increases engagement between locking members 30 and locking apertures 24 to prevent a loose connection. Installing locking members 30 may further have the step of installing retainer 36 to retain first end 18 of shaft 16, such as by threadably engaging shaft-receiving aperture 22.

In some embodiments, first portion 26 of locking aperture 24 may be two radiused slots machined 180 degrees apart into shaft-receiving aperture 22 of valve closure member 12. Second portion 28 of locking apertures 24 may be two identical radiused slots machined longitudinally along the center line of shaft 16 such that they form a cylindrical aperture when combined. Other cross-sectional shapes may also be used, although a circular cross-section is preferred. The depth of these slots may change along their length to create a taper. The slots may be identical and designed to allow use of two simple round pins as locking members 30. The taper of the radiused slots may be designed so that the interior pressure that naturally tends to move shaft 16 outward from valve closure member 12 will tighten the connection between shaft 16 and valve closure member 12 to remove any hysteresis when rotating the shaft. In particular, while a loose fitting connection may have some range of movement in shaft 16 prior to movement of valve closure member 12, the tightened connection will result in movement of shaft 16 and valve closure member 12 occurring together. The use of tapered slots equally engaged with shaft 16 and closure member 12 may also facilitate a strong, uniform connection. Preferably, slots are shallow to minimize the reduction in the cross section of shaft 16, allowing for high yield strength to be maintained. The wedging effect of the connection may also allow for the entire length and diameter of each locking pin 30 to be engaged to distribute torque loads evenly and create a unified connection. Retainer 36 may be used to stop shaft 16 from sliding inward when valve 10 is not under pressure, such as during shipping or transportation.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A valve, comprising:
    a valve closure member in a valve housing;
    a shaft having a first end and a second end, the first end being received within a shaft-receiving aperture of the valve closure member, and the second end extending out of the valve housing;
    one or more locking apertures defined by a first portion formed in an inner surface of the shaft-receiving aperture of the valve closure member and a second portion formed in an outer surface of the shaft, the locking apertures extending along and being angled outward from a rotational axis of the shaft and toward the first end of the shaft; and
    one or more locking members, each locking member being inserted into one of the locking apertures and engaging the first portion and the second portion of the respective locking aperture, the locking member securing the position of the shaft relative to the valve closure member such that rotation of the shaft about the rotational axis rotates the valve closure member between an open position and a closed position and such that internal pressure from within the valve housing increases the engagement between the locking members and the locking apertures.

2. The valve of claim 1, comprising two or more locking apertures and two or more locking members.

3. The valve of claim 2, wherein the two or more locking apertures are spaced evenly about a circumference of the shaft.

4. The valve of claim 1, further comprising a retainer that threadably engages the shaft-receiving aperture and retains the first end of the shaft.

5. The valve of claim 1, wherein the first end of the shaft has an outer diameter that is less than an inner diameter of the shaft-receiving apertures such that the first end of the shaft is insertable through the shaft-receiving apertures prior to the locking members being inserted into the locking apertures.

6. The valve of claim 1, wherein the one or more locking apertures are exclusively accessible via an inner cavity of the valve housing when the shaft is received within the shaft receiving aperture.

7. The valve of claim 1, wherein the valve closure member is a ball valve.

8. A method of assembling a valve, comprising:
    inserting a valve closure member into a valve housing;
    inserting a first end of a shaft through the valve housing and the valve closure member such that the first end is received within a shaft-receiving aperture of the valve closure member and such that a second end of the shaft extends out of the valve housing; and
    installing one or more locking members in one or more locking apertures, each locking aperture being defined by a first portion formed in an inner surface of the shaft-receiving aperture of the valve closure member and a second portion formed in an outer surface of the shaft, each locking aperture extending along and being angled outward from a rotational axis of the shaft and toward the first end of the shaft, wherein each locking member engages the first portion and the second portion of the respective locking aperture to secure the position of the shaft relative to the valve closure member such that rotation of the shaft about the rotational axis rotates the valve closure member between an open position and a closed position and such that internal pressure from within the valve housing increases the engagement between the one or more locking members and the one or more locking apertures.

9. The method of claim 8, wherein the one or more locking apertures comprise two or more locking apertures and the one or more locking members comprises two or more locking members.

10. The method of claim 9, wherein the two or more locking apertures are spaced evenly about a circumference of the shaft.

11. The valve of claim 8, wherein installing locking members further comprises the step of installing a retainer, the retainer threadably engaging the shaft-receiving aperture and retaining the first end of the shaft.

12. The method of claim 8, wherein the first end of the shaft has an outer diameter that is less than an inner diameter of the shaft-receiving apertures.

13. The method of claim 8, wherein the one or more locking apertures are exclusively accessible via an inner cavity of the valve housing when the shaft is received within the shaft receiving aperture.

14. The method of claim 8, wherein the valve closure member is a ball valve.

* * * * *